C. S. SWANEY.
REAR LIGHT FOR AUTOMOBILES AND THE LIKE.
APPLICATION FILED FEB. 6, 1920.
1,394,046.
Patented Oct. 18, 1921.
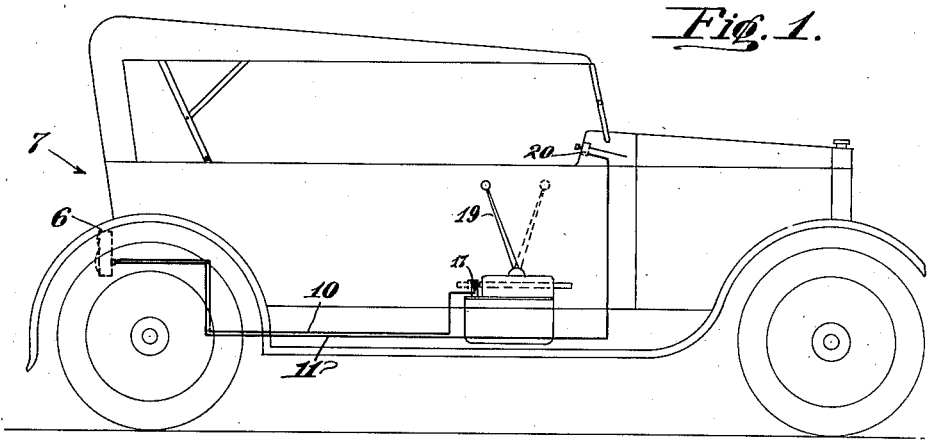
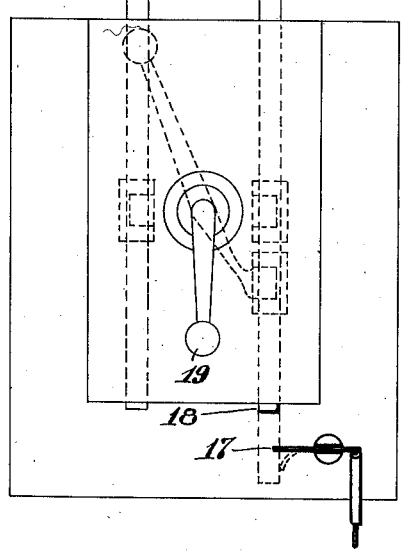
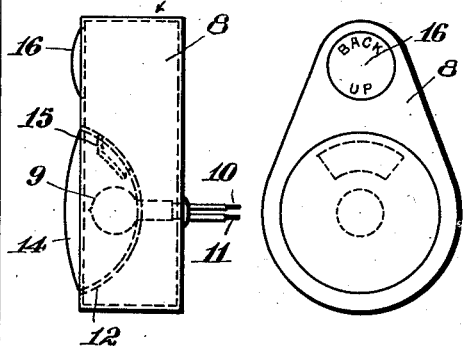
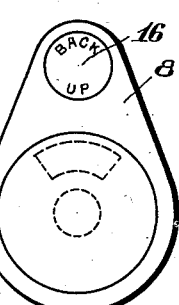
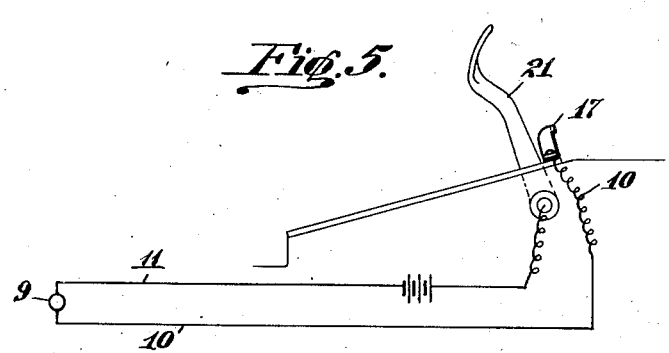
INVENTOR
CLARENCE S. SWANEY;
BY
ATTORNEY

UNITED STATES PATENT OFFICE.

CLARENCE S. SWANEY, OF LOS ANGELES, CALIFORNIA.

REAR LIGHT FOR AUTOMOBILES AND THE LIKE.

1,394,046.  Specification of Letters Patent.  Patented Oct. 18, 1921.

Application filed February 6, 1920. Serial No. 356,789.

*To all whom it may concern:*

Be it known that I, CLARENCE S. SWANEY, a citizen of the United States, residing at Los Angeles, in the county of Los Angeles and State of California, have invented new and useful Improvements in Rear Light for Automobiles and the like, of which the following is a specification.

This invention relates to a lighting arrangement for auto vehicles and particularly pertains to a means for illuminating the ground rearward of a vehicle and at the same time serve as a signal light when the vehicle is moving in a reverse or backward direction.

It is the object of this invention to provide a construction whereby electric current may be automatically directed through an electric lamp disposed on the rear of an auto vehicle and in which the control of the current is effected by operation of a reverse lever in such manner that the lamp will be illuminated only when the lever is in its reversing position.

Another object is to provide a lamp control of the above character by means of which a warning signal will be given to indicate that the vehicle to which it is applied is about to or is traveling in a backward direction so as to put drivers of rear vehicles and others on their guard; and which, furthermore, is so constructed and arranged that the lamp will operate to throw a spread of light rays on the ground from the rear of the vehicle sufficient to enable the driver to readily discern the condition of the roadway so as to enable him to avoid obstructions and danger in backing up in the dark.

Other objects will appear hereinafter.

The invention is illustrated in the accompanying drawings, in which:

Figure 1 is a view in diagram illustrating the application of the invention;

Fig. 2 is a plan view showing the manner of effecting closing of an electric circuit by the operation of a clutch control hand lever;

Fig. 3 is a detail in side elevation of the lamp;

Fig. 4 is a view of the lamp in front elevation;

Fig. 5 is a detail illustrating the manner of closing the electric circuit by a foot operated clutch control lever.

More specifically, 6 indicates the lamp which is especially designed to be mounted on the rear end of an auto-vehicle 7 at any suitable point thereon; this lamp comprising a housing 8 which may be of any suitable construction and embodying an electric light bulb 9 connecting with a pair of electrical conductors 10 and 11. The electric light bulb 9 is arranged in an ordinary reflector 12, preferably of the parabolic type, covered by a white-light glass 14 of such size and shape as to permit a broad spread of light rays rearward of the vehicle and sufficient to enable the driver to readily discern objects for some distance to the rear of the vehicle so that in backing up in the dark dangerous obstructions may be avoided. The reflector 12 is formed with an opening 15 in the upper portion thereof, through which light rays may pass into the upper part of the lamp housing to illuminate a ruby glass 16 arranged above the white-light glass to provide a warning signal light for indicating to persons rearward of the vehicle that the latter is moving or about to be moved rearward; the ruby glass preferably bearing such indicia as the words "Back up."

The conductor 10 leads from the lamp to a suitable contact point 17 forming one contact element of a switch, the other contact element of which may consist of or be operated by any suitable movable portion of the reversing mechanism of the auto-vehicle, by which an electric current may be directed through the lamp only when such reverse mechanism is about to be operated and during its operation. For example, as shown in Fig. 2 a longitudinally movable bar 18 adapted to be actuated by the hand control lever 19 in throwing the vehicle driving mechanism in reverse is shown as constituting a contact member which on being moved into engagement with the contact member 17, as indicated in dotted lines in Fig. 2, will close a circuit through the conductor 10; the bar 18 being either grounded in an electrical circuit or carrying a separate contact point connected to one side of a source of electrical supply. The conductor 11 connects with the other terminal of the source of electrical supply, which may be of any suitable character such, for example, as a magneto circuit or a battery circuit; the conductor 11 being here shown as leading from an ammeter relay 20. Where the invention is applied to the type of auto-vehicles employing a foot lever 21 for controlling reverse movement, the contact member 17 may be disposed at any convenient point to form an electrical circuit through the lamp on advancing the foot lever.

The operation of the invention is obvious from the foregoing, it being seen that on operating the lever to throw the reversing mechanism into operation, a circuit will be closed through the conductor 10, lamp 9 and conductor 11, thereby illuminating the lamp to project a major portion of the light from the reflector to illumine the road rearwardly of the vehicle and to illumine the indicia bearing plate to indicate to observers the driver's intention of reversing the motion of the vehicle. In this manner the device not only serves to warn observers to the rear of the vehicle but illumines the road rearwardly thereof for the benefit of the driver.

While I have shown and described a specific embodiment of the invention, it is manifest that various changes may be made in the details of construction and the arrangement of the parts without departing from the spirit and scope of the invention as set forth in the appended claims.

I claim:

1. In combination with a reverse mechanism of an auto vehicle, a lamp casing, a reflector disposed within said casing and formed with an opening to allow rays of light to enter said casing, an electric lamp disposed in said reflector to project light rearwardly of the vehicle, a translucent indicia bearing plate disposed in said casing so that part of the light emanating from said lamp will pass through said opening and through said translucent indicia bearing plate to render it apparent at night, and circuit closing means disposed to be actuated upon movement of said reversing mechanism to cause a current to pass through said lamp; whereby the road rearwardly of said vehicle is illumined.

2. In a combination with a reverse mechanism of auto vehicles, a lamp casing, a reflector disposed within said casing and formed with an opening to allow rays of light to enter said casing, an electric lamp disposed in said reflector to project light rearwardly of the vehicle, a translucent indicia bearing plate disposed in said casing so that part of the light emanating from said lamp will pass through said opening and through said translucent indicia bearing plate to render it apparent at night, and circuit closing means disposed to be actuated upon movement of said reversing mechanism to cause a current to pass through said lamp; whereby the road rearwardly of said vehicle is illumined and the indicia bearing panel is illumined; said circuit closing means comprising a yieldable and a fixed contact member, the yieldable member disposed to be pressed against said fixed member by a moving part of said mechanism.

CLARENCE S. SWANEY.